C. H. MALMEDIE.
ADJUSTABLE REAMER.
APPLICATION FILED MAY 6, 1909.
972,115.
Patented Oct. 4, 1910.
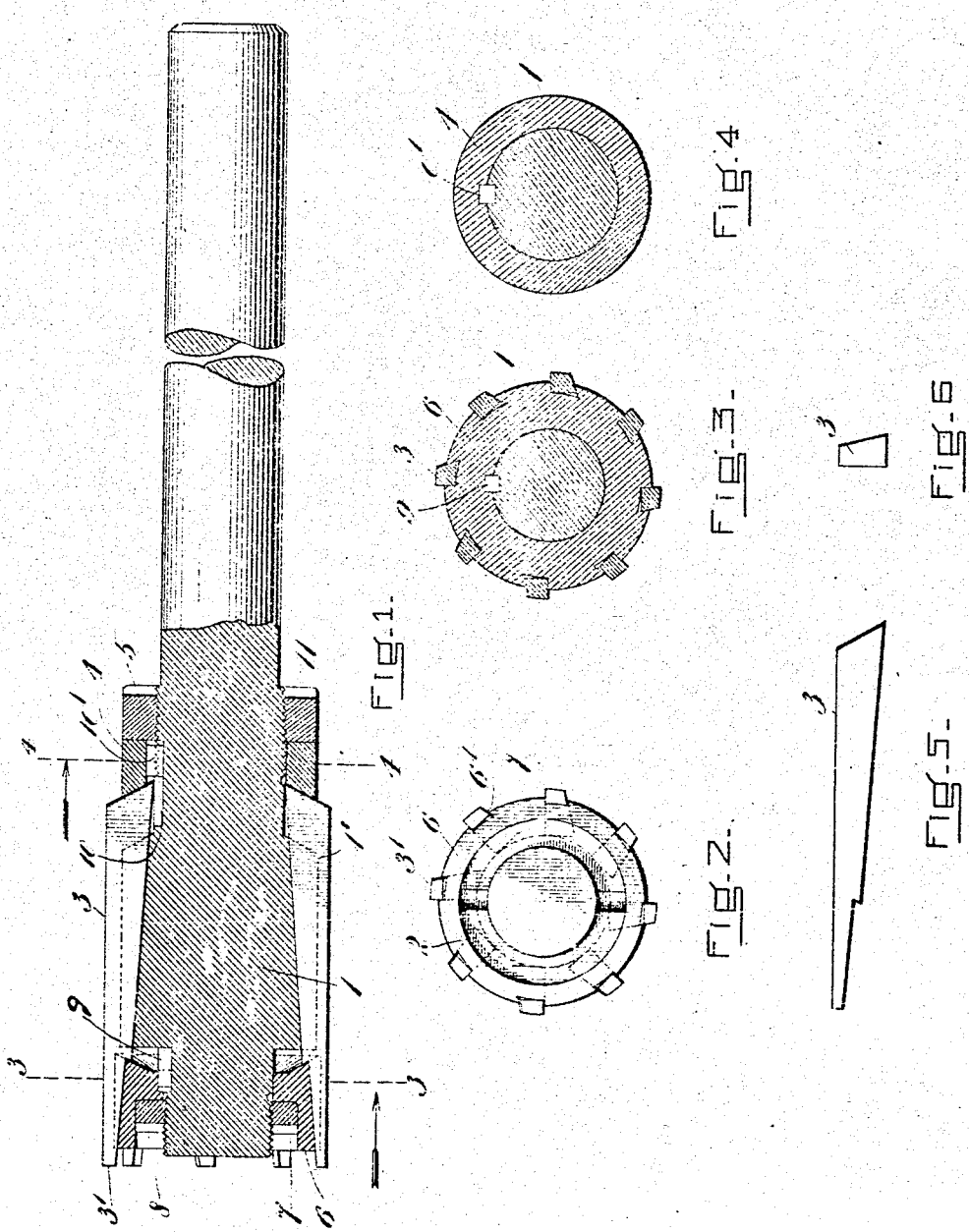
WITNESSES
E. B. Tomlinson
Patrick J. Conroy
INVENTOR
Charles H. Malmedie
by Browne & Woodworth
Attys.

UNITED STATES PATENT OFFICE.

CHARLES H. MALMEDIE, OF NEW BEDFORD, MASSACHUSETTS, ASSIGNOR TO MORSE TWIST DRILL & MACHINE COMPANY, OF NEW BEDFORD, MASSACHUSETTS.

ADJUSTABLE REAMER.

972,115.　　　Specification of Letters Patent.　　Patented Oct. 4, 1910.

Application filed May 6, 1909. Serial No. 494,458.

*To all whom it may concern:*

Be it known that I, CHARLES H. MALMEDIE, a citizen of the United States, and a resident of New Bedford, in the county of Bristol and State of Massachusetts, have invented a new and useful Improvement in Adjustable Reamers, of which the following is a specification.

My invention relates to adjustable reamers and its object is to improve the construction of said reamers in the manner hereinafter set forth whereby their solidity may be increased and their gage conveniently and accurately varied.

My invention will be described in connection with the drawings which accompany and form a part of this specification, in which—

Figure 1 is a side view of one form of my improved adjustable reamer partly in section, Fig. 2 is an end view of the reamer shown in Fig. 1, Fig. 3 is a transverse section on the line 3—3 of Fig. 1, Fig. 4 is a transverse section on the line 4—4 of Fig. 1, Fig. 5 is a side view of one of the cutting blades, Fig. 6 is an end view of the cutting blade shown in Fig. 5.

In the drawings selected for illustrating the particular embodiments of my invention herein disclosed, 1 represents a stock having an enlarged forward portion constituting a head 1' provided with a plurality of longitudinal and radial slots 2, herein shown as eight in number, the bottom of each slot being inclined with respect to the central axis of the stock. A cutting blade 3 of suitable cross-section, shown in the present instance as tapering toward the top, is located in each of the slots and a portion of the cutting surface 3' of each blade projects beyond the forward end of the stock so as to permit the reaming of a bore to the bottom thereof. The under side of each blade is inclined with respect to the axis of the stock so that when the blades are in position in the slots, their cutting surfaces will be parallel to the axis of the stock. The rear end of each blade is beveled, and a correspondingly beveled washer 4 engages with the beveled end portions of all of the blades. A lock-nut 5 having slots 11' for taking a wrench is threaded to the stock and engages said beveled washer. In order to prevent the movement of said washer around the longitudinal axis of the stock, a key-way 10 taking a key 10' may be provided. In order that the ends of the blades may project beyond the forward end of the stock, it is necessary to secure the blades to the forward end of the stock by means coöperating with the under side of the blades, and this I accomplish in the present instance by providing the under side of each blade with a beveled portion with which the correspondingly beveled supporting washer 6 coöperates. This washer is provided with as many longitudinally extending slots 6' as there are blades and the forward portion of each blade rests in one of said slots. The lock-nut 7, which may be provided with slots 8' for a wrench, is threaded to the forward end of the stock and the key 9 may be employed to prevent the washer 6 from turning about the stock.

When it is desired to increase the gage of the reamer, the forward nut 8 is loosened and the rear nut 5 is turned in such direction as to move the blades simultaneously forward until the reamer has the desired diameter whereupon the nut 8 is tightened. To reduce the gage of the reamer, the rear nut 5 is loosened and the forward nut 8 is turned so as to move the blades simultaneously backward until the desired diameter has been reached whereupon the nut 8 is tightened.

It will be understood that many modifications may be made in the particular embodiments of my invention herein described without departing from the principle thereof.

I claim:

In an adjustable reamer, a stock, cutting blades each having a beveled portion and a beveled washer coöperating with the beveled portions of said blades, said washer being provided with slots for receiving and supporting the forward ends of said blades.

In testimony whereof, I have hereunto subscribed my name this 29th day of April 1909.

CHARLES H. MALMEDIE.

Witnesses:
　SETH J. BESSE,
　GEORGE H. H. ALLEN.